Oct. 20, 1970 M. J. ZIMMERMAN 3,534,933
CHANGE DISPENSER STAND
Filed July 2, 1968
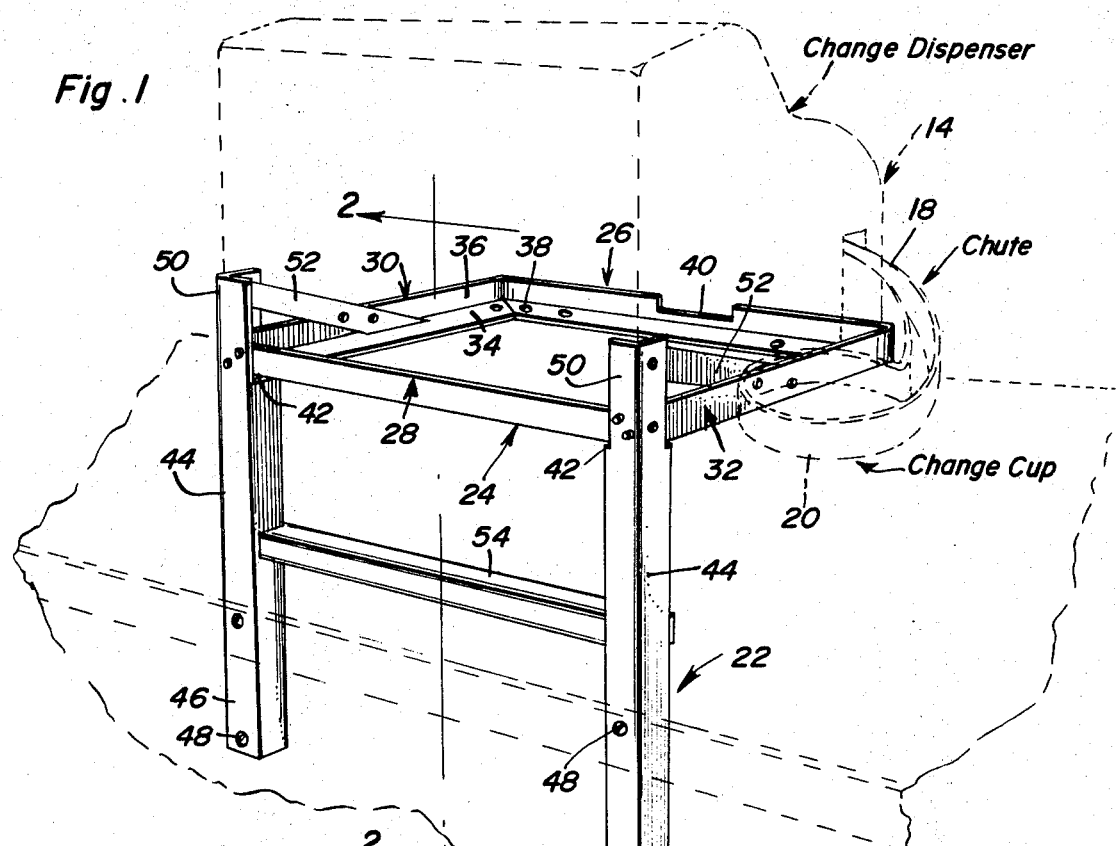
Fig. 1
Fig. 2
Mervin J. Zimmerman
INVENTOR.
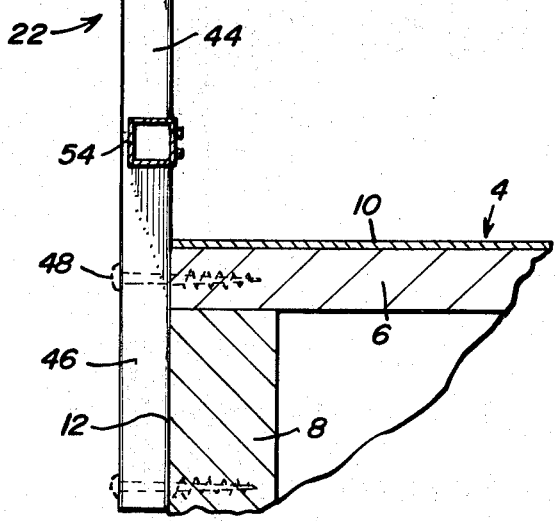

United States Patent Office 3,534,933
Patented Oct. 20, 1970

3,534,933
CHANGE DISPENSER STAND
Mervin J. Zimmerman, 112 S. Main,
Davidsville, Pa. 15928
Filed July 2, 1968, Ser. No. 742,037
Int. Cl. A47f 9/02
U.S. Cl. 248—14      3 Claims

ABSTRACT OF THE DISCLOSURE

A change dispenser stand is installed at a suitable site on a conveyor-equipped cashier's check-out counter which, as usual, borders the customer's exit aisle. The lower ends of uprights are bolted above the shopping cart guard rail. A shallow tray-like shelf provides a stable positioning and holding rack for the change dispensing machine. This shelving rack or holder suspends the machine above and out of the way of the conveyor belt and locates the coin chute and pickup cup in a conveniently accessible position to serve the cashier and customer.

---

This invention relates to a special purpose stand which is expressly designed, constructed and adapted to install and properly suspend a change dispenser at a site for practical use on the check-out conveyor counter in a self-service grocery store or similar establishment.

While there is an acknowledged need for a change dispensing machine at the cashier's check-out station, matters involving site of use, accessibility for the cashier and customer and restricted space difficulties have posed heretofore unsolved problems. An object of the present invention is to provide a simple, practical and efficient stand which when properly mounted will meet mass production and installation requirements of manufacturers, will be enthusiastically endorsed by retailers and self-service store owners, and will well serve the needs of users.

Briefly, the essence of the invention has to do with a novel and feasible stand and the combination of said stand with the conveyor-equipped counter, the space or area in which the cashier and assistant, if any, operate and the restricted aisle through which the customer, with or without the shopping cart, must pass to the bagging and cart loading terminal or area. More particularly, the self-contained prefabricated stand is preferably but not necessarily, made of aluminum or equivalent components and comprises a shelf-like rack in which the change dispensing machine is snugly nested and retentively held and a pair of depending legs or uprights which are bolted to the vertical wall of the counter structure above the cart guide and guard rail and which support the shelf or rack in a suitably elevated position over the article conveyor belt or equivalent surface.

To the ends desired, the unique stand lends itself to use with cash registers and change dispensers in that the component parts are made from appropriate aluminum. The parts are cooperably strong and durable and coordinate in providing a structure which will withstand shock and vibration imposed by constant operation of the dispensing machine and the motor driven check-out belt. As will be hereinafter clear, this stand can be easily installed in that attaching screws or bolts can be applied with little or no difficulty. For best results the rack comprises a shallow tray-like frame in which the base portion of the machine is firmly seated and bolted by way of pre-drilled holes.

In addition to the above it will be appreciated that the stand is an innovation in that it is effectually adaptable to currently popular conveyor-type check-out stations. It is out of the way of the customer and yet allows the commodities and merchandise to travel under the elevated frame and dispenser toward the packing area without obstruction or hindrance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing the improved change dispenser stand, how the same is mounted at the desired site of use on the check-out counter and how, in phantom lines, the change dispenser is nested and retained for use in the tray-like shelf or rack.

FIG. 2 is a view with parts in section and elevation taken on the plane of the vertical section line 2—2 of FIG. 1.

Persons conversant with the field of invention herein under consideration are aware that check-out and bagging stations in self-service stores vary in construction and serviceability and for such reasons no effort is herein made to illustrate or stress the cashier's restricted area of operation or the cash register. However and in the interest of background information it may be properly mentioned that the concept, while directed primarily to the unique stand nevertheless takes into consideration an appropriate counter structure, a change dispenser and the coordination therewith of a dispenser basing and elevating stand.

With reference to FIG. 2 the numeral 4 designates, broadly speaking, a counter structure wherein the horizontal component or platform is denoted at 6 and the complemental vertical wall component at 8. The numeral 10 designates an endless conveyor or an equivalent article receiving and conveying belt. In actual practice the vertical wall 8 defines one lengthwise side of an open-ended customer's aisle through which the empty shopping cart may be pushed for bagging and loading purposes at the terminal end of the counter. The surface 12 of the wall, on which the stand is mounted, may be and usually is equipped with a wear resisting guide or guard rail (not shown). The coin or change holding and dispensing machine is denoted by the numeral 14 and here again since machines in this category vary in construction no effort is herein being made to illustrate the same in detail. It follows that the machine is denoted generally by the numeral 14, the seated and supported base portion being denoted at 16. As shown in FIG. 1 the numeral 18 designates an appropriate gravity-type chute communicatively connected with a now well-known type of change cup 20. The over-all change dispenser stand is denoted by the numeral 22 in FIG. 1. The stand is such in construction that it lends itself to cooperative use with the counter means 4 and change dispenser 14. Keeping in mind the restricted area or zone in which the cashier is stationed and the limited nature of the customer's aisle it is evident that the stand 22 in order to orient itself with the counter and dispenser must be simple, practical and such that dispenser will occupy a carefully planned site of use so that it will be accessible to the cashier and also the customer who, at the time, is being served.

The stand is preferably but not necessarily made of aluminum and accordingly needs no finishing to blend with cash registers, change dispensers and check-out stands. It must be of very rigid construction so that it will not tilt from constant vibration of the machine or the motor driven check-out belt. It has to be capable of easy and reliable installation. It is preferably such in construction that it can be bolted to the check-out counter above the cart guard rail. Holes will be drilled for each individual installation.

The stand 22 is characterized by a dispenser seating and elevating shelf 24 which occupies a horizontal position elevated above the belt 10 in the manner shown in FIGS. 1 and 2. The shelf comprises a rectangular frame which is made up of four complemental aluminum or equivalent angle irons; namely, longitudinal coplanar spaced parallel angle irons 26 and 28 and end or transverse angle irons 30 and 32. The horizontal flanges 34 provide a suitable supporting ledge for the base portion 16 of the change dispenser 14. The upstanding vertical flanges 36 provide an encircling rim which not only positions but confines the machine to the position shown. Pre-drilled holes are provided at 38 for securing the machine in its nested place. The clearance notch 40 serves to accommodate an electric current conducting cable (not shown). The corner portions of the frame which are adjacent the customer's aisle are securely supported on shoulders 42 provided adjacent the upper end portions of the tubular spaced parallel depending support legs or uprights 44. To the ends desired the lower end portions 46 are superimposed upon the surface 12 and are screwed or otherwise bolted in place as at 48. The upper end portion of each upright is cut away to define shoulders 42 and also an angular upstanding extension 50 which provides piloting and stabilizing means for the coacting corner portions of the change dispenser. The numeral 52 designates left and right diagonal braces which are attached to the extensions 50 and also fastened to the adjacent flanges 36. This construction and arrangement provides a strong and reliable shelf and holder for the dispenser. The numeral 54 denotes a horizontal brace, mounted between median portions of the legs or uprights.

In practice the stand 22 is positioned and bolted in place on the counter construction 4 in the manner shown in the drawings. When thus in position the shelf or rack provides a reliable support for the change dispenser. Accordingly, the invention well serves the purposes for which it is intended.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restorted to, falling within the scope of the invention as claimed.

What is claimed as new is as follows:

1. For installation and use on a conveyor-type counter bordering the cart and customer's aisle of a self-service cashier's check-out station, a self-contained stand capable of erecting and supporting a change dispensing machine in an out of the way but readily accessible position over and above the article conveying surface of said counter, said stand comprising a horizontal shelf and a pair of post-like uprights having upper ends and lower ends which are capable of being securely fastened to and anchored in predetermined positions on the above-named counter, said shelf comprising a frame composed of angle irons having coacting ends united, said angle irons providing horizontal ledge-like flanges capable of firmly seating the base portion of said change dispensing machine and vertical flanges defining a rim capable of conformingly encompassing exterior surfaces of said base portion, said uprights comprising hollow tubes having median portions joined by a brace said upper end portions being partially cut away to provide shoulders and complemental extensions projecting above the plane of said shoulders, coacting corner portions of said frame being seated atop said shoulders, said extensions being angle-like in cross-section and providing piloting guards in which respectively cooperable corners of said base portion are nested, secured and stabilized, and diagonal braces fixed to said extensions and end portions respectively, of said frame.

2. For installation and use on a conveyor-type counter bordering the cart and customer's aisle of a self-service cashier's check-out station, a self-contained stand capable of mounting and supporting a conventional type change dispensing machine in an out of the way but readily accessible position over and above the articles conveying surface of said counter, said stand comprising a pair of vertically elongated spaced parallel post-like uprights having intermediate portions rigidly joined together, lower end portions which are adapted to be superimposed upon and fastened to predetermined surface portions of a vertical wall of the aforementioned counter, and upper end portions which are adapted to project to a given plane above the horizontal plane of said counter, said upper end portions being provided with companion paired shoulders and extensions projecting above the position of said shoulders, said extensions being angle-like in cross-section and providing piloting and positioning guards, and a horizontal tray-like shelf characterized by a frame, said frame embodying coordinated upwardly opening angle irons providing ledge-like flanges which are adapted to seat the base portion of said change dispensing machine and marginal vertical flanges defining a rim, said rim being adapted to conformingly surround exterior surface portions of said base portion, said frame being disposed in a horizontal plane at right angles to said uprights and having like corner portions seated atop coacting ones of the aforementioned seating shoulders and nested in respectively cooperable portions of said extensions and being rigidly secured thereto.

3. The stand defined in and according to claim 2, and wherein said extensions projecting to a plane above the plane of the frame, and paired diagonal braces having outer ends secured to the respectively cooperable extensions and inner ends fixed to portions of the vertical flanges which are adjacent thereto.

References Cited

UNITED STATES PATENTS

| 2,430,454 | 11/1947 | Cormier | 248—311 X |
| 2,941,706 | 6/1960 | Slater | 211—90 X |

FOREIGN PATENTS 600,866  8/1934  Germany.

ROY D. FRAZIER, Primary Examiner

J. F. FOSS, Assistant Examiner

U.S. Cl. X.R.

108—28, 152; 248—309